Jan. 29, 1935. J. G. SHODRON 1,989,530
METHOD AND APPARATUS FOR THE STORAGE, CURING, AND PRESERVATION OF HAY
Filed Oct. 14, 1932
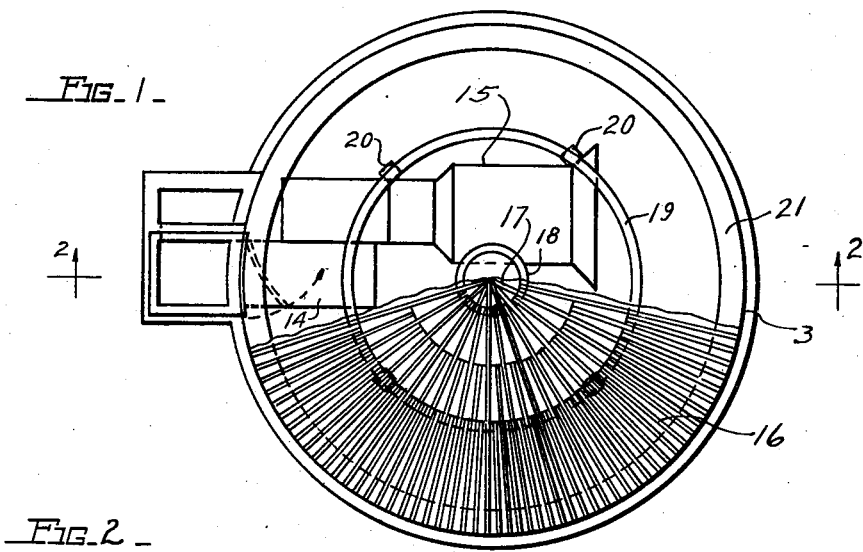
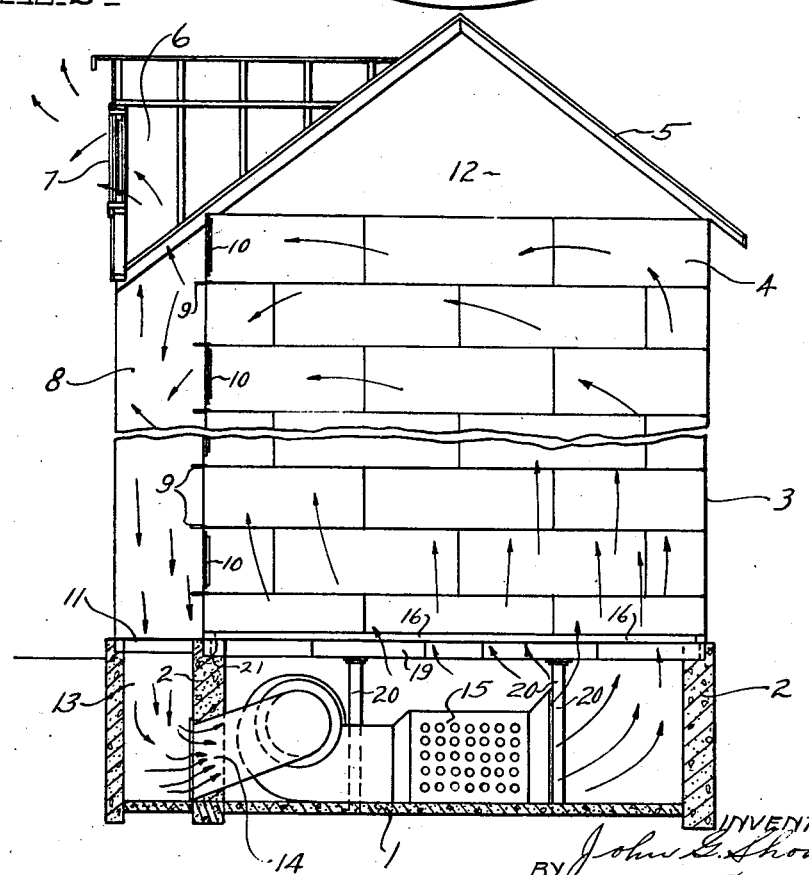

Patented Jan. 29, 1935

1,989,530

UNITED STATES PATENT OFFICE 1,989,530

METHOD AND APPARATUS FOR THE STORAGE, CURING, AND PRESERVATION OF HAY

John G. Shodron, Fort Atkinson, Wis., assignor to James Manufacturing Company, Fort Atkinson, Wis., a corporation of Wisconsin Application October 14, 1932, Serial No. 637,816

11 Claims. (Cl. 34—19)

My invention relates to a method of and apparatus for the storage, curing and preservation of hay.

It is my object to provide means of preventing ignition of the hay by spontaneous combustion or ignition by lightning or static electricity.

It is my object to provide means of forcibly and positively ventilating an enclosure containing hay throughout the entire hay mass, the hay mass being of such proportions as to permit of this ventilation throughout the mass and the evacuation of combustible gases from the mass, the reduction of temperature to a safe temperature of the mass of hay and the circulation through the hay of tempered air where it is desirable to cure the hay or maintain it in a dry condition.

It is a further object to be able to control the moisture content in the hay either at the beginning of its storage, continuously or intermittently during storage.

In particular, it is my object to so process chopped hay of uniform size so that a uniform result will be obtained.

It is a further object to be able to place the hay in the container, to preserve it and air dry it or cure it when desirable, even through the hay is stored with more moisture or in a greener condition than would ordinarily be possible in the storage of hay.

It is a further object of my invention to so provide such a heating system as to keep the hay from moulding to keep it in a fresh, semi-green condition and to regulate its temperature.

It is one of the primary purposes of my invention to provide a fireproof storage chamber for the hay and to provide means of withdrawing measured quantities of the hay only sufficient for delivery to the adjacent stable for a single feeding so there will be no accumulation of hay in the stable where it will be a hazardous, fire-producing agency.

In particular, it is my object to provide a metal container of such conductivity and mass that it will act as a conductor for electricity, particularly lightning, so as to prevent the hay from being ignited by lightning.

Such a metal container also acts as a lightning rod for the protection of adjacent buildings within its immediate zone.

Referring to the drawing:

Figure 1 is a top plan view of a container for hay partially broken away to show the floor construction through which air may be circulated;

Figure 2 is a section on the line 2—2 of Figure 1.

Referring to the drawing in detail, 1 is the floor of a cellar having the side walls 2 constituting a foundation for a container designated 3 for hay. This container is preferably made of sections of metal indicated at 4. The container can be made of any desired material, such as wood or tile, but it is highly desirable to have it of metal as it constitutes a conductor for electricity, and is a protection against lightning, can be fabricated at a factory by sections and erected by bolting or welding on a farm. This container 3 carries a roof 5 having a dormer 6 with a vent window 7 above the chute 8. The chute 8 is provided with the rungs 9 of a ladder so as to give access to the doors 10 in the container 3. This permits of hay being removed from the container and delivered through the chute 8 so as to be fed to the stock. The bottom of the chute 8 is provided with a grill 11, if desired, so that air, hot or otherwise, may be circulated out of the top 12 or through the doors 10 downwardly into the grill 11 into the cellar passageway 13 thence into the eye of the blower 14 whence air is delivered over heating or cooling coils 15 and thence delivered upwardly through the spaced bars 16 of a grating which supports the hay mass.

It is preferred to have the hay chopped in short sections in order to give uniformity to the entire mass of hay, but, in view of the grating 16, it is often desirable to place layer of unchopped hay over the gratings to prevent the small pieces of chopped hay falling down between the gratings. This does not prevent the free circulation of the hot air throughout the entire hay mass.

It will be noted that the gratings are formed in two general sections. The central section at 17 has the bars resting upon the inner ring 18 and the outer ends on the intermediate ring 19 supported on the columns 20. The outer bars 16 have their inner ends resting on the ring 19 and the outer ledge 21.

The heat for the coils 15 may be supplied by any desired form of heater.

The hay is delivered through the dormer window 7 by an appropriate chute. When the hay is chopped, it is usually blown through a chute into the container 3 and evenly distributed throughout the container.

The principle to be observed in the practice of my process is to have the hay mass of such diameter and thickness that it readily facilitates the circulation of air, hot or otherwise, throughout the entire mass to ventilate, cure and dry the entire mass of hay to prevent it from moulding to carry away ignitible gases and to maintain the hay at a proper temperature.

It is, therefore, possible to place the hay in the container in either a moist or damp condition which would not be possible without this forced draft of heated air. The hay is preserved in superior condition free from mould and free from danger of spontaneous combustion.

Process

My process comprehends the harvesting of the hay, allowing the hay to dry in the field to a greater or lesser degree depending upon weather conditions, but preferably gathering it during the course of the day while still green or during the following day, chopping it in fine condition in sections from one to three or four inches long, blowing it into the container and evenly distributing it by such blowing.

Hay, even when properly cured, goes through a process of internal curing when stored after the field curing. This process results in the generation of heat and of gases that are combustible, and frequently results in disastrous fires due to spontaneous combustion as the temperature rises to the point of combustion due to this process of internal curing. This results, even if it does not terminate in a fire, in so drying out the hay that it becomes unpalatable to stock, or the hay chars, the leaves easily shatter, as in the case of alfalfa, and the mass becomes one mainly of small particles and dust which cannot be handled and which cannot be eaten with safety by stock. Numerous pulmonary diseases result from the consumption of such hay by stock.

My process, on the other hand, by taking the hay when in semi-green or semi-moist condition from the field places the hay in such condition that it may be completely consumed.

I control the temperature and evolution of gases and prevent ignition by static electricity from lightning, etc. I prevent the formation of mould due to the presence of moisture in unventilated hay. I regulate the temperature of the hay, its rate of artificial curing and drying and the rate of evolution and evacuation of its gases. By my process I provide a forced draft throughout the entire hay mass when the hay is thus stored so that it is progressively cured resulting in a hay that is a bright green color, of delicate flavor and is in such condition that it can be readily handled and consumed by the stock, both with enjoyment and safety.

I have found that hay has a tendency to mould, a tendency to char, particularly in certain zones. It also has a tendency to sweat, particularly where one part of it is against an outside wall and another part is located in the interior of the mass where it is not ventilated and where heat may be generated to a high degree. This results in hay of irregular quality so that the stock feeder is unable to determine whether he will have sufficient good hay to carry him through the entire season. By my invention, I am able to insure uniform quality of all the hay throughout the entire stack and, therefore, to insure the stock feeder of the full quantity of hay which he has put away in the container.

My invention has another advantage in that it is susceptible to being combined with the ventilation of the stock feeding barns which communicate with the container and thereby provide pleasant working conditions for the stock and the men, both in the handling of the hay and in the feeding of the stock, which is of special advantage in cold countries where it is desirable that such conditions apply and where clean, dry, semi-green feed is supplied to the stock.

By my invention a single unitary heating system provides complete circulatory connections for this purpose.

It will be understood that where I refer to "heat" I do so in the generic sense of either heating or cooling and even in the sense of applying moisture in the place of temperature controlling apparatus, as by heating pipes or cooling pipes.

It will also be understood that when I refer to "hay" I refer to any food product of similar character: my invention is also adaptable for the storage and handling of grain of various types.

It will be understood that I desire to comprehend within my invention such modifications as may be necessary to adapt it to varying conditions and uses.

Having thus fully described my invention, what I claim as new and desire to secure by Letters Patent, is:

1. In a method of storing hay including placing partially cured hay in a weatherproof container having a foraminous floor and a vertical passageway along a wall thereof with openings and doors therefor located in vertically arranged relation, forcing air by forced draught through substantially all portions of the foraminous floor upwardly through the mass of partially cured hay and through the openings, applying a minus pressure adjacent the bottom of the passageway to cause at least the major portion of air passing into said passageway to return for re-use and subsequently applying pressure to again force the air upward through the foraminous floor and through the hay, and controlling the amount of air circulated by opening or closing the doors in the passageway.

2. In a method of storing hay including placing partially cured hay in a weatherproof container having a foraminous floor and a vertical passageway along a wall thereof, with openings and doors therefor located in vertically arranged relation, forcing heated air by forced draught through substantially all portions of the foraminous floor upwardly through the mass of partially cured hay and through the openings, applying a minus pressure adjacent the bottom of the passageway to cause at least the major portion of air passing into said passageway to return for re-use and subsequently applying pressure to again force the air upward through the foraminous floor and through the hay, and controlling the amount of air circulated by opening or closing the doors in the passageway.

3. In a method of storing hay including placing partially cured hay in a weatherproof container having a foraminous floor and a vertical passageway along a wall thereof with openings and doors therefor located in vertically arranged relation, forcing air by forced draught upwardly through the mass of partially cured hay and through the openings, applying a minus pressure adjacent the bottom of the passageway to cause at least the major portion of air passing into said passageway to return for re-use and subsequently applying pressure to again force the air upward through the foraminous floor and through the hay, and controlling the amount of air circulated, by opening or closing the doors in the passageway, and mixing fresh air with the air which has passed upwardly through the hay before recirculating the same.

4. In a method of storing hay including placing partially cured hay in a weatherproof container having a foraminous floor and a vertical passageway along a wall thereof, with openings and doors therefor located in vertically arranged relation, forcing heated air by forced draught through substantially all portions of the foraminous floor upwardly through the mass of partially cured hay and through the openings, applying a minus pressure adjacent the bottom of the passageway to cause at least the major portion of air passing into said passageway to return for re-use and subsequently applying pressure to again force the air upward through the foraminous floor and through the hay, and controlling the amount of air circulated by opening or closing the doors in the passageway, and mixing fresh air with the heated air which has passed upwardly through the hay.

5. In an apparatus for storing and curing hay, a container for hay having a wall with doors therein and a foraminous floor, a basement under the floor, a duct on the wall over the doors, said duct being connected to the basement, and means in the basement to cause air to circulate through the floor and the hay in the container, out at the doors, and through the duct back to the basement.

6. In an apparatus for storing and curing hay, a basement, a hay container supported over the basement, said container having a foraminous floor and a roof, a dormer window in the roof, a duct at one side of the container, said duct being connected at one end with the dormer window and at its other end with the basement and connected intermediate its ends with the interior of the container, and means to cause air to circulate through the basement, container and the duct.

7. In an apparatus for storing and curing hay, a hay container having a foraminous floor and a roof, a dormer window in the roof, a duct at one side of the container, said duct being connected at one end to the dormer window and connected intermediate its ends to the interior of the container, and means connected to the other end of the duct to draw air through the dormer window and from the container and force it through the floor into the container.

8. A storage container for hay having a foraminous substantially flat bottom for supporting the body of the hay, said foraminous bottom forming an air inlet for a forced vertical column of upwardly driven air, said container having imperforate side walls, an air passageway located along a wall of said container and having air inlets therefore located in vertically arranged relation, said air passageway having a combined inlet and outlet for fresh air, a blower having an outlet to said foraminous bottom, and an inlet to said blower formed at the bottom of said air passageway, whereby all air is forced at substantially equal pressure through all parts of said foraminous bottom and returned through said air passageway to said blower.

9. A storage container for hay having a foraminous substantially flat bottom for supporting the body of the hay, said container having substantially air-tight walls and roof, said foraminous bottom forming an air inlet for a forced vertical column of upwardly driven air, said container having imperforate side walls, an air passageway located along a wall of said container and having air inlets therefore located in vertically arranged relation, said air passageway having a combined inlet and outlet for fresh air, means for closing said combined air inlet and outlet whereby said container is made substantially air-tight, a blower having an outlet to said foraminous bottom, and an inlet to said blower formed at the bottom of said air passageway, whereby all air is forced at substantially equal pressure through all parts of said foraminous bottom and returned through said air passageway to said blower.

10. A storage container for hay having a foraminous substantially flat bottom for supporting the body of the hay, said foraminous bottom forming an air inlet for a forced vertical column of upwardly driven air, said container having imperforate side walls, an air passageway located along a wall of said container, said air passageway having a plurality of openings having closures therefor located in vertically arranged relation whereby air may be withdrawn from the hay at a plurality of selected points, said air passageway having a combined inlet and outlet for fresh air, a blower having an outlet to said foraminous bottom, and an inlet to said blower formed at the bottom of said air passageway, whereby all air is forced at substantially equal pressure through all parts of said foraminous bottom and returned through said air passageway to said blower.

11. A storage container for hay having a foraminous substantially flat bottom for supporting the body of the hay, a chamber located beneath said foraminous bottom, said bottom forming the air inlet for a forced vertical column of upwardly driven air, said container having imperforate side walls and provided with an air passageway located adjacent said side walls, said air passageway having a plurality of vertically arranged openings, means for selectively closing said openings, said air passageway having an air inlet for fresh air, means for circulating the air located in said chamber, said air passageway having an inlet to said air circulating means located in said chamber, and heater means located in said chamber having a passageway connecting said air circulating means, the outlet from said heater means being located adjacent said foraminous bottom, whereby all air is forced at substantially equal pressure through all parts of said foraminous bottom and withdrawn selectively through said openings, at least parts of said withdrawn air being returned to said air circulating means.

JOHN G. SHODRON.